US009117460B2

(12) United States Patent
Lahti

(10) Patent No.: US 9,117,460 B2
(45) Date of Patent: Aug. 25, 2015

(54) DETECTION OF END OF UTTERANCE IN SPEECH RECOGNITION SYSTEM

(75) Inventor: Tommi Lahti, Tampere (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 2218 days.

(21) Appl. No.: 10/844,211

(22) Filed: May 12, 2004

(65) Prior Publication Data

US 2005/0256711 A1 Nov. 17, 2005

(51) Int. Cl.
*G10L 15/00* (2013.01)
*G10L 15/04* (2013.01)
*G10L 25/87* (2013.01)

(52) U.S. Cl.
CPC .................................... *G10L 25/87* (2013.01)

(58) Field of Classification Search
USPC .................. 704/251, 252, 253, 255, 256, 258
See application file for complete search history.

(56) References Cited

U.S. PATENT DOCUMENTS

| | | | | | |
|---|---|---|---|---|---|
| 4,821,325 | A * | 4/1989 | Martin et al. | 704/253 |
| 5,621,859 | A * | 4/1997 | Schwartz et al. | 704/256 |
| 5,740,318 | A | 4/1998 | Naito et al. | |
| 5,819,222 | A * | 10/1998 | Smyth et al. | 704/256.1 |
| 5,848,388 | A * | 12/1998 | Power et al. | 704/239 |
| 5,884,259 | A * | 3/1999 | Bahl et al. | 704/252 |
| 5,999,902 | A * | 12/1999 | Scahill et al. | 704/240 |
| 6,076,056 | A * | 6/2000 | Huang et al. | 704/254 |
| 6,374,219 | B1 * | 4/2002 | Jiang | 704/255 |
| 6,405,168 | B1 * | 6/2002 | Bayya et al. | 704/256 |
| 6,873,953 | B1 | 3/2005 | Lennig | |
| 7,711,561 | B2 * | 5/2010 | Hogenhout et al. | 704/256.5 |
| 2002/0165715 | A1 * | 11/2002 | Riis et al. | 704/254 |
| 2004/0019483 | A1 * | 1/2004 | Deng et al. | 704/239 |
| 2004/0254790 | A1 * | 12/2004 | Novak et al. | 704/240 |
| 2005/0049873 | A1 * | 3/2005 | Bartur et al. | 704/256 |
| 2005/0149337 | A1 * | 7/2005 | Asadi et al. | 704/277 |

FOREIGN PATENT DOCUMENTS

| | | | |
|---|---|---|---|
| EP | 0895224 A2 | 2/1999 |
| JP | 2005017932 | 1/2005 |
| WO | WO 94/22131 | 9/1994 |

OTHER PUBLICATIONS

Stoltze et al, "Integrated Circuits for a Real Time Large Vocabulary Continuous Speech Recognition System", Jan. 1991, IEEE journal of Solid State Circuits, vol. 26, No. 1, pp. 2-11.*

Kuroiwa et al., 1999. S. Kuroiwa, M. Naito, S. Yamamoto and N. Higuchi , Robust speech detection method for telephone speech recognition system. Speech Communication 27 2 (1999), pp. 135-148.*

(Continued)

*Primary Examiner* — Olujimi Adesanya
(74) *Attorney, Agent, or Firm* — Borden Ladner Gervais LLP

(57) ABSTRACT

The present invention relates to speech recognition systems, especially to arranging detection of end-of utterance in such systems. A speech recognizer of the system is configured to determine whether recognition result determined from received speech data is stabilized. The speech recognizer is configured to process values of best state scores and best token scores associated with frames of received speech data for end of utterance detection purposes. Further, the speech recognizer is configured to determine whether end of utterance is detected or not, based on the processing, if the recognition result is stabilized.

36 Claims, 4 Drawing Sheets

(56) References Cited

OTHER PUBLICATIONS

Sep. 1995, Kazuya Takeda, Shingo Kuroiwa, Masaki Naito and Seiichi Yamamoto, Top-Down Speech Detection and N-Best Meaning Search in a Voice Activated Telephone Extension System, pp. 1075-1078, 4th European Conference on Speech Communication and Technology, Madrid, ISSN.
Maria Rangoussi, Anastasios Delopoulos and Michail Tsatsanis, on the Use of Higher-Order Statistics for Robust Endpoint Detection of Speech, pp. 56-60, 1993 IEEE.
Takeda K., Kuroiwa S., Naito M. and Yamamoto S. "*Top-Down Speech Detection and N-Best Meaning Search in a Voice Activated Telephone Extension System*" ESCA. EuroSpeech 1995, Madrid, Sep. 1995.
Young, Russell, Thornton: "*Token passing: a Simple Conceptual model for Connected Speech Recognition Systems*", Cambridge University Engineering Department, Jul. 31, 1989.
Printed from Internet May 12, 2004, Hidden Markov Model Toolkit (HTK) which is available at HTK homepage http://htk.eng.cam.ac.uk/.

* cited by examiner

DETECTION OF END OF UTTERANCE IN SPEECH RECOGNITION SYSTEM

FIELD OF THE INVENTION

The invention relates to speech recognition systems, and more particularly to detection of end of utterance in speech recognition systems.

BACKGROUND OF THE INVENTION

Different speech recognition applications have been developed during recent years for instance for car user interfaces and mobile terminals, such as mobile phones, PDA devices and portable computers. Known applications for mobile terminals include methods for calling a particular person by saying aloud his/her name into the microphone of the mobile terminal and by setting up a call to the number according to the name/number associated with a model best corresponding to the speech input from the user. However, present speaker-dependent methods usually require that the speech recognition system is trained to recognize the pronunciation for each word. Speaker-independent speech recognition improves the usability of a speech-controlled user interface, because the training stage can be omitted. In speaker-independent word recognition, the pronunciation of words can be stored beforehand, and the word spoken by the user can be identified with the pre-defined pronunciation, such as a phoneme sequence. Most speech recognition systems use Viterbi search algorithm which builds a search through a network of Hidden Markov Models (HMMs) and maintains most likely path score at each state in this network for each frame or time step.

Detection of end of utterance (EOU) is an important aspect relating to speech recognition. The aim of the EOU detection is to detect the end of speaking as reliable and quickly as possible. When the EOU detection has been made the speech recognizer can stop decoding and the user gets the recognition result. By well working EOU detection the recognition rate can also be improved since noise part after the speech is omitted.

Different techniques have been developed for EOU detection. For instance, the EOU detection may be based on the level of detected energy, based on detected zero crossings, or based on detected entropy. However, these methods often prove to be too complex for constrained devices such as mobile phones. In case of speech recognition being performed in a mobile device, a natural place to gather information for EOU detection is the decoder part of the speech recognizer. The advancement of the recognition result for each time index (one frame) can be followed as the recognition process proceeds. The EOU can be detected and the decoding can be stopped when a pre-determined number of frames have produced (substantially) the same recognition result. This kind of approach for EOU detection has been presented by Takeda K., Kuroiwa S., Naito M. and Yamamoto S. in publication "Top-Down Speech Detection and N-Best Meaning Search in a Voice Activated Telephone Extension System". ESCA. EuroSpeech 1995, Madrid, September 1995.

This approach is herein referred to as the "stability check of the recognition result". However, there are certain situations where this approach fails: If there is a long enough silence portion before speech data is received, the algorithm will send EOU detection signal. Hence, end of speech may be erroneously detected even before the user begins to talk. Too early EOU detections may occur due to delay between names/words or even during speech in certain situations when using the stability check based EOU detection. In noisy environments it may be the case that such EOU detection algorithm cannot detect EOU at all.

BRIEF DESCRIPTION OF THE INVENTION

There is now provided an enhanced method and arrangement for EOU detection. Different aspects of the invention include a speech recognition system, method, an electronic device, and a computer program product, which are characterized by what has been disclosed in the independent claims. Some embodiments of the invention are disclosed in the dependent claims.

According to an aspect of the invention, a speech recognizer of a data processing device is configured to determine whether recognition result determined from received speech data is stabilized. Further, the speech recognizer is configured to process values of best state scores and best token scores associated with frames of received speech data for end of utterance detection purposes. If the recognition result is stabilized, the speech recognizer is configured to determine whether end of utterance is detected or not, based on the processing of best state scores and best token scores. Best state score refers generally to a score of a state having the best probability amongst a number of states in a state model for speech recognition purposes. Best token score refers generally to best probability of a token amongst a number of tokens used for speech recognition purposes. These scores may be updated for each frame comprising speech information.

An advantage of arranging the detection of end of utterance according in this way is that the errors relating to silent periods before speech data is received, delays between speech segments, EOU detections during speech, and missed EOU detections (e.g. due to noise) can be reduced or even avoided. The invention provides also computationally economical way for EOU detection since pre-calculated state and token scores may be used. Thus the invention is also very well suitable for small portable devices such as mobile phones and PDA devices.

According to an embodiment of the invention, the best state score sum is calculated by summing the best state score values of a pre-determined number of frames. In response to the recognition result being stabilized, the best state score sum is compared to a predetermined threshold sum value. The detection of end of utterance is determined if the best state score sum does not exceed the threshold sum value. This embodiment enables to at least reduce above mentioned errors, being especially useful against errors relating to silent periods before speech data is received and errors EOU detections during speech.

According to an embodiment of the invention, best token score values are determined repetitively and the slope of the best token score values is calculated based on at least two best token score values. The slope is compared to a pre-determined threshold slope value. The detection of end of utterance is determined if the slope does not exceed the threshold slope value. This embodiment enables to at least reduce errors relating to silent periods before speech data is received and also long pauses between words. This embodiment is especially useful (and better than the above embodiment) against errors relating to EOU detections during speech since the best token score slope is very well tolerant against noise.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
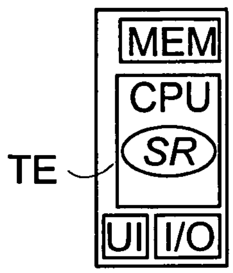
FIG. 1 shows a data processing device, wherein the speech recognition system according to the invention can be implemented.

FIG. 1 illustrates a simplified structure of a data processing device (TE) according to an embodiment of the invention. The data processing device (TE) can be, for example, a mobile phone, a PDA device or some other type of portable electronic device, or part or an auxiliary module thereof. The data processing device (TE) may in some other embodiments be a laptop/desktop computer or an integrated part of another system, e.g. as a part of a vehicle information control system. The data processing unit (TE) comprises I/O means (I/O), a central processing unit (CPU) and memory (MEM). The memory (MEM) comprises a read-only memory ROM portion and a rewriteable portion, such as a random access memory RAM and FLASH memory. The information used to communicate with different external parties, e.g. a CD-ROM, other devices and the user, is transmitted through the I/O means (I/O) to/from the central processing unit (CPU). If the data processing device is implemented as a mobile station, it typically includes a transceiver Tx/Rx, which communicates with the wireless network, typically with a base transceiver station through an antenna. User Interface (UI) equipment typically includes a display, a keypad, a microphone and a loudspeaker. The data processing device (TE) may further comprise connecting means MMC, such as a standard form slot, for various hardware modules, which may provide various applications to be run in the data processing device.

The data processing device (TE) comprises a speech recognizer (SR) which may be implemented by software executed in the central processing unit (CPU). The SR implements typical functions associated with a speech recognizer unit, in essence it finds mapping between sequences of speech and pre-determined models of symbol sequences. As is assumed below, the speech recognizer SR may be provided with end of utterance detection means with at least part of the features illustrated below. It is also possible that an end of utterance detector is implemented as a separate entity.

The functionality of the invention relating to the detection of end of utterance and described in more detail below may thus be implemented in the data processing device (TE) by a computer program which, when executed in a central processing unit (CPU), affects the data processing device to implement procedures of the invention. Functions of the computer program may be distributed to several separate program components communicating with one another. In one embodiment the computer program code portions causing the inventive functions are part of the speech recognizer SR software. The computer program may be stored in any memory means, e.g. on the hard disk or a CD-ROM disc of a PC, from which it may be downloaded to the memory MEM of a mobile station MS.

It is also possible to use hardware solutions or a combination of hardware and software solutions to implement the inventive means. Accordingly, each of the computer program products above can be at least partly implemented as a hardware solution, for example as ASIC or FPGA circuits, in a hardware module comprising connecting means for connecting the module to an electronic device and various means for performing said program code tasks, said means being implemented as hardware and/or software.

In one embodiment the speech recognition is arranged in SR by utilizing HMM (Hidden Markov) models. Viterbi search algorithm may be used to find match to the target words. This algorithm is a dynamic algorithm which builds a search through a network of Hidden Markov Models and maintains the most likely path score at each state in this network for each frame or time step. This search process is time-synchronous: it processes all states at the current frame completely before moving on to the next frame. At each frame, the path scores for all current paths are computed based on a comparison with the governing acoustic and language models. When all the speech data has been processed, the path with the highest score is the best hypothesis. Some pruning technique may be used to reduce the Viterbi search space and to improve the search speed. Typically, a threshold is set at each frame in the search whereby only paths whose score is higher than the threshold are extended to the next frame. All others are pruned away. The most commonly used pruning technique is the beam pruning which advances only those paths whose score falls within a specified range. For more details on HMM based speech recognition, reference is made to Hidden Markov Model Toolkit (HTK) which is available at HTK homepage http://htk.eng.cam.ac.uk/.

An embodiment of the enhanced multilingual automatic speech recognition system, applicable for instance in a data processing device TE described above, is illustrated in FIG. 2.

Figure 2:
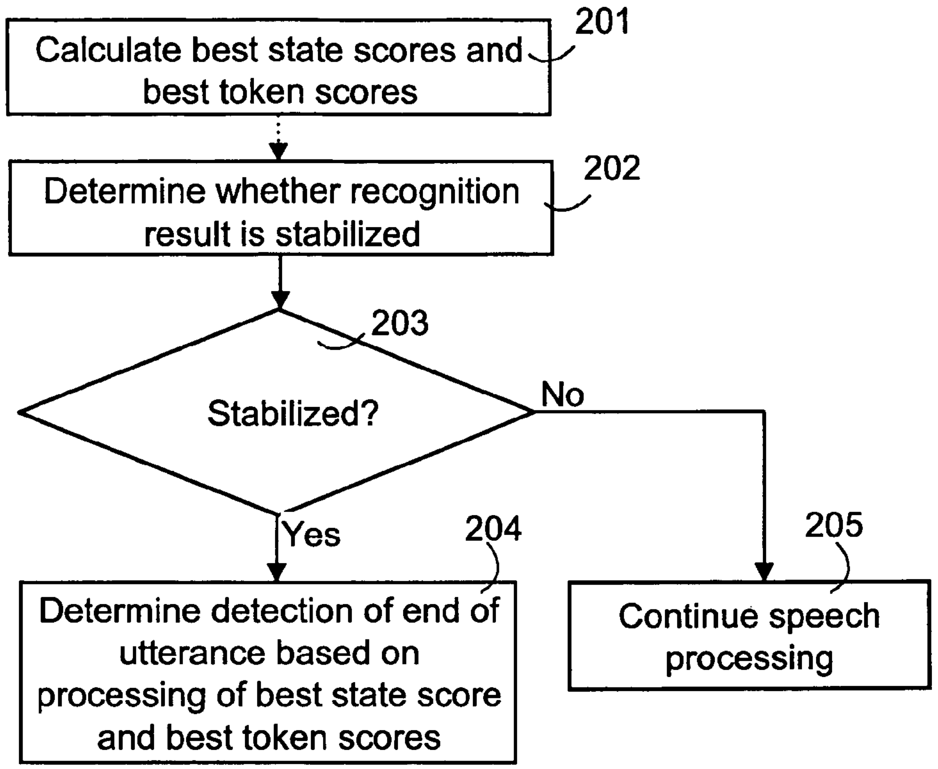
FIG. 2 shows a flow chart of a method according to some aspects of the invention.

In the method illustrated in FIG. 2 the speech recognizer SR is configured to calculate 201 values of best state scores and best token scores associated with frames of received speech data for end of utterance detection purposes. For more details on state score calculation, reference is made to Chapters 1.2 and 1.3 of the HTK, incorporated as reference. More specifically, the following formula (1.8 in the HTK) determines how state scores can be calculated. HTK allows each observation vector at time t to split into a number of S independent data streams ($o_{st}$). The formula for computing output distribution $b_j(o_t)$ is then $$b_j(o_t) = \prod_{s=1}^{S}\left[\sum_{m=1}^{Ms} c_{jsm} N\left(o_{st}; \mu_{jsm}, \sum_{jsm}\right)\right]^{\gamma_s} \quad (1)$$

where $M_s$ is the number of mixture components in stream s, $c_{jam}$ is the weight of the m'th component and $N(.; \mu, \Sigma)$ is a multivariate Gaussian with mean vector $\mu$ and covariance matrix $\Sigma$, that is:

$$N\left(o; \mu, \sum\right) = \frac{1}{\sqrt{(2\pi)^n |\Sigma|}} e^{-1/2(o-\mu)'\Sigma^{-1}(o-\mu)} \quad (2)$$

where n is the dimensionality of o. The exponent $\gamma_s$ is a stream weight. To determine best state score, information on state scores is maintained. The state score giving the highest state score is determined as the best state score. It is to be noted that that it is not necessary to follow strictly above given formulas but state scores may also be calculated in other ways. For instance, the product over s in formula (1) may be omitted in the calculation.

Token passing is used to transfer score information between states. Each state of a HMM (at time frame t) holds a token comprising information on partial log probability. A token represents partial match between observation sequence (up to time t) and the model. A token passing algorithm propagates and updates tokens at each time frame and passes the best token (having the highest probability at time t−1) to next state (at time t). At each time frame, the log probability of a token is accumulated by corresponding transition probabilities and emission probabilities. The best token scores are thus found by examining all possible tokens and selecting the ones having the best scores. As each token is passing through a search tree (network), it maintains a history recording its route. For more details on token passing and token scores, reference is made to "*Token passing: a Simple Conceptual model for Connected Speech Recognition Systems*", Young, Russell, Thornton, Cambridge University Engineering Department, Jul. 31, 1989, which is incorporated herein as reference.

The speech recognizer SR is also configured to determine 202, 203 whether the recognition results determined from received speech data have been stabilized. If the recognition results are not stabilized, speech processing may be continued 205 and also step 201 may be again entered for next frames. Conventional stability check techniques may be utilized in step 202. If the recognition result is stabilized, the speech recognizer is configured to determine 204 whether end of utterance is detected or not, based on the processing of best state score and best token scores. If the processing of best state scores and best token scores also indicates that speech is ended, the speech recognizer SR is configured to determine detection of end of utterance and end speech processing. Otherwise speech processing is continued, and also step 201 may be returned for next speech frames. By utilizing also best state scores and best token scores and suitable threshold values, the errors relating to EOU detection using only stability check can be at least reduced. Values already calculated for speech recognition purposes may be utilized in step 204. It is possible that some or all best state score and/or best token score processing is done for EOU detection purpose only if the recognition result is stabilized, or they may be processed continuously taking into account new frames. Some more detailed embodiments are illustrated in the following.

Figure 3A:
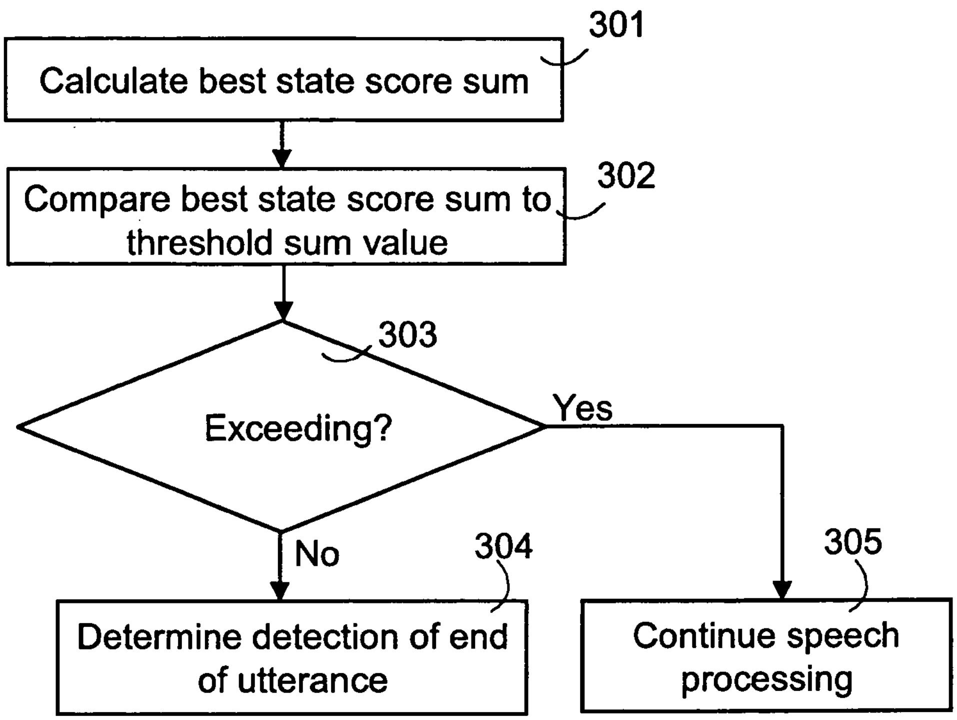
FIGS. 3*a*, 3*b*, and 3*c* are flow charts illustrating some embodiments according to an aspect of the invention.

In FIG. 3*a* an embodiment relating to the best state scores is illustrated. The speech recognizer SR is configured to calculate 301 the best state score sum by summing the best state score values of a pre-determined number of frames. This may be done continuously for each frame.

The speech recognizer SR is configured to compare 302, 303 the best state score sum to a predetermined threshold sum value. In one embodiment, this step is entered in response to the recognition result being stabilized, not shown in FIG. 3*a*. The speech recognizer SR is configured to determine 304 detection of end of utterance if the best state score sum does not exceed the threshold sum value.

Figure 3B:
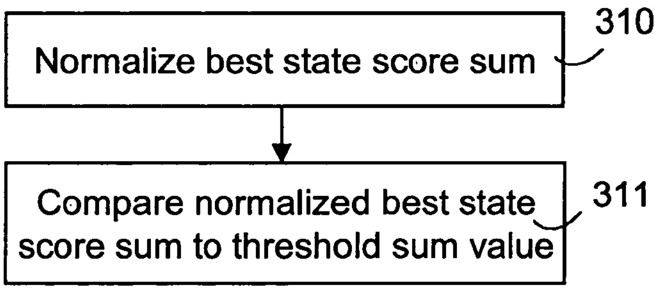

FIG. 3*b* illustrates a further embodiment relating to the method in FIG. 3*a*. In step 310 the speech recognizer SR is configured to normalize the best score sum. This normalization may done by the number of detected silence models. This step 310 may be performed after step 301. In step 311 the speech recognizer SR is configured to compare the normalized best state score sum to the pre-determined threshold sum value. Step 311 may thus replace step 302 in the embodiment of FIG. 3*a*.

Figure 3C:
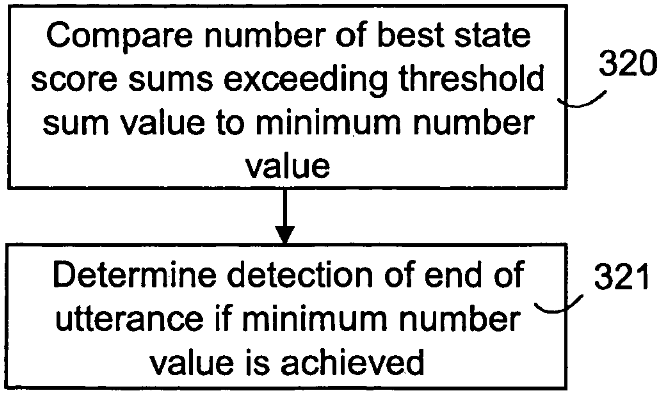

FIG. 3*c* illustrates a further embodiment relating to the method in FIG. 3*a*, possibly incorporating also features of FIG. 3*b*. The speech recognizer SR is further configured to compare 320 the number of (possibly normalized) best state score sums exceeding the threshold sum value to a predetermined minimum number value defining the required minimum number of best state score sums exceeding the threshold sum value. For instance, the step 320 may be entered after step 303 if "Yes" is detected, but before step 304. In step 321 (which may thus replace step 304) the speech recognizer is configured to determine detection of end of utterance if the number of best state score sums exceeding the threshold sum value is the same or larger than the predetermined minimum number value. This embodiment enables further to avoid too early end of utterance detections.

In the following an algorithm for calculating the normalized sum of the last #BSS values is illustrated.

```
Initialization
#BSS = BSS buffer size (FIFO)
BSS = 0;
BSS_buf[#BSS] = 0;
#SIL = #BSS //   The number of winning silence models in the buffer
For each T {
   get BSS
   Update BSS_buf
   Update #SIL
   IF ( #SIL < SIL_LIMIT ) {
                 BSS_sum = Σ_i BSS_buf[i]
                 BSS_sum = BSS_sum/(#BSS−#SIL)
   }
   ELSE
                 BSS_sum=0;
}
```

In the above exemplary algorithm the normalization is done based on the size of the BSS buffer.

Figure 4A:
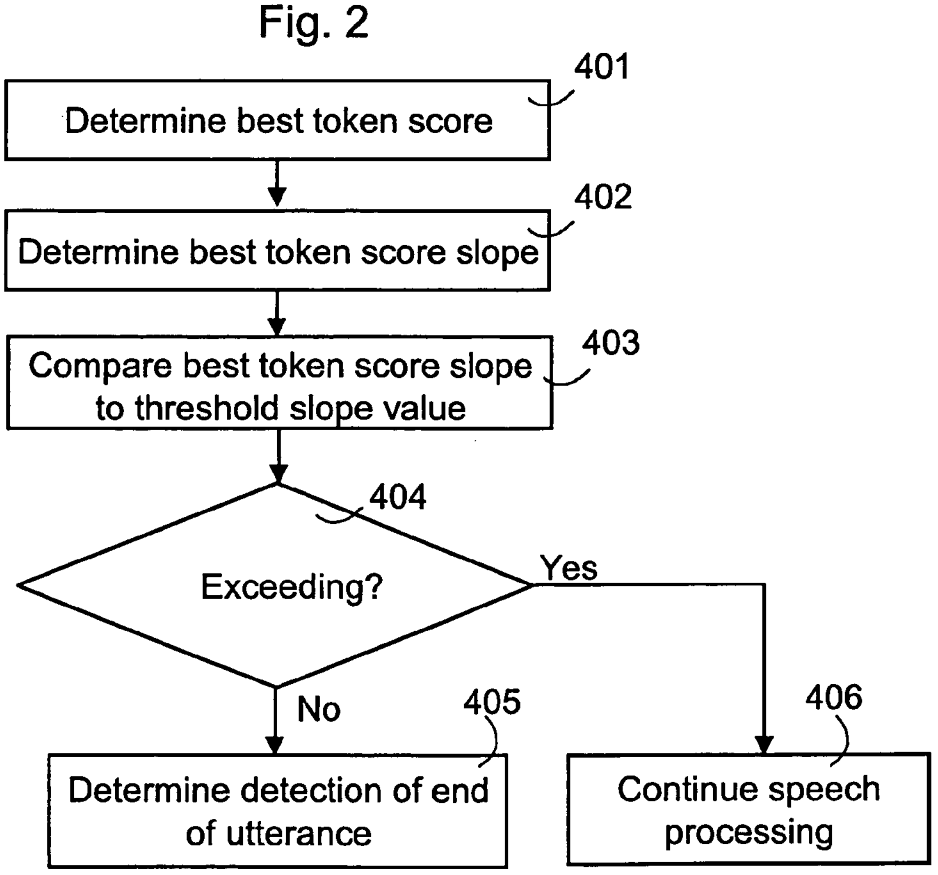
FIGS. 4*a* and 4*b* are flow charts illustrating some embodiments according to an aspect of the invention.

FIG. 4*a* illustrates an embodiment for utilizing best token scores for end of utterance detection purposes. In step 401 the speech recognizer SR is configured to determine the best token score value for the current frame (at time T). The speech recognizer SR is configured to calculate 402 the slope of the best token score values based on at least two best token score values. The amount of best token score values used in the calculation may be varied; in experiments it has been noticed that it is adequate that less than ten last best token score values are used. The speech recognizer SR is in step 403 configured to compare the slope to a pre-determined threshold slope value. Based on the comparison 403, 404, if the slope does not exceed the threshold slope value, the speech recognizer SR may determine 405 detection of end of utterance. Otherwise speech processing is continued 406 and also step 401 may be continued.

Figure 4B:
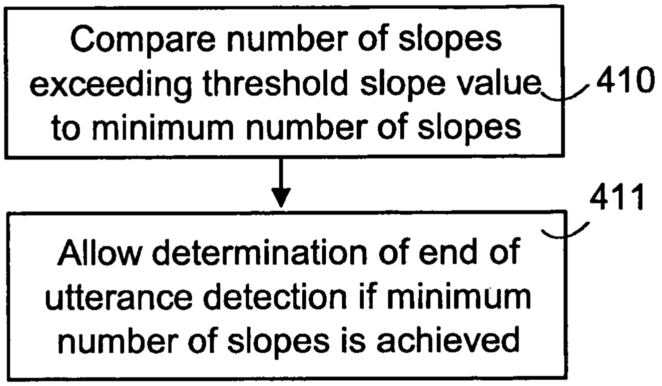

FIG. 4*b* illustrates a further embodiment relating to the method in FIG. 4*a*. In step 410 the speech recognizer SR is further configured to compare the number of slopes exceeding the threshold slope value to a predetermined minimum number of slopes exceeding the threshold slope value. The step 410 may be entered after step 404 if "Yes" is detected, but before step 405. In step 411 (which may thus replace step 405) the speech recognizer SR is configured to determine detection of end of utterance if the number of best state score sums exceeding the threshold slope value is the same or larger than the predetermined minimum number.

In a further embodiment the speech recognizer SR is configured to begin slope calculations only after a pre-determined number of frames has been received. Some or all of the above features relating to best token scores may be repeated for each frame or only for some of the frames.

In the following an algorithm for arranging slope calculation is illustrated:

```
Initialization
#BTS = BTS buffer size (FIFO)
for each T {
   Get BTS
   Update BTS_buf
   Calculate the slope using the data
   { (x_i,y_i) }, where i=1,2,..., #BTS, x_i=i
   and y_i=BTS [i-1].
}
```

The formula for calculation of slope in the above algorithm is:

$$\text{slope} = \frac{n\sum x_i y_i - \left(\sum x_i\right)\left(\sum y_i\right)}{n\sum x_i^2 - \left(\sum x_i\right)^2} \tag{3}$$

Figure 5:
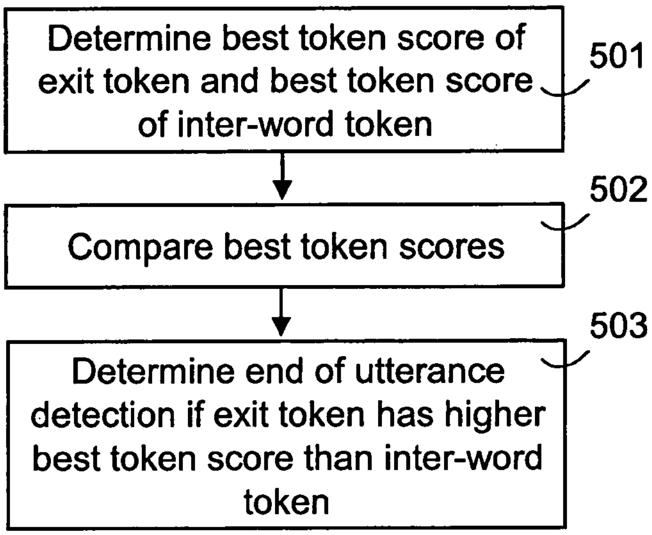
FIG. 5 shows a flow chart of an embodiment according to an aspect of the invention.

According to an embodiment illustrated in FIG. 5, the speech recognizer SR is configured to determine 501 at least one best token score of an inter-word token and at least one best token score of an exit token. In step 502 the speech recognizer SR is configured to compare these best token scores. The speech recognizer SR is configured to determine 503 detection of end of utterance only if the best token score value of the exit token is higher than the best token score of the inter-word token. This embodiment can be a supplementing one and implemented before step 404 is entered, for instance. By using this embodiment, the speech recognizer SR may be configured to detect end of utterance only if an exit token provides the best overall score. This embodiment enables further to reduce or even avoid problems related to pauses between spoken words. Again, it is feasible to wait a predetermined time period after start of speech processing before allowing EOU detection or by starting the evaluation only after a pre-determined number of frames has been received.

Figure 6:
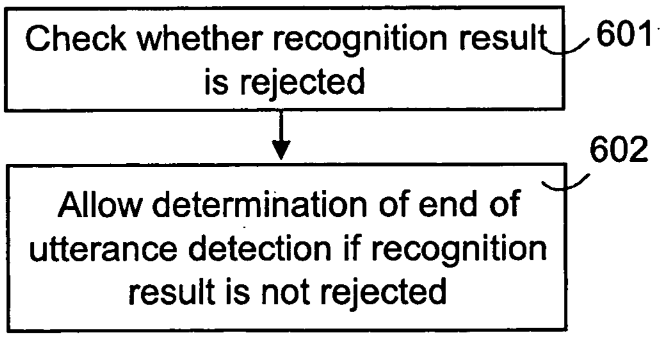
FIG. 6 shows a flow chart of an embodiment of the invention.

As illustrated in FIG. 6, according to an embodiment the speech recognizer SR is configured to check 601 whether a recognition result is rejected. Step 601 may be initiated before or after other applied end of utterance related checking features. The speech recognizer SR may be configured to determine 602 detection of end of utterance only if the recognition result is not rejected. For instance, based on this check the speech recognizer SR is configured not to determine EOU detection although other applied EOU checks would determine EOU detection. In another embodiment, the speech recognizer SR does not continue to make other applied EOU checks based on the result (reject) of this embodiment for the current frame, but continues speech processing. This embodiment enables to avoid errors caused by delay before starting to speak, i.e. to avoid EOU detection before speech.

According to an embodiment, the speech recognizer SR is configured to wait a pre-determined time period from the beginning of speech processing before determining detection of end of utterance. This may be implemented such that the speech recognizer SR does not perform some or all of the above illustrated features related to end of utterance detection, or that the speech recognizer SR will not make positive end of utterance detection decision until the time period has elapsed. This embodiment enables to avoid EOU detections before speech and errors due to unreliable results at the early stage of speech processing. For instance, tokens have to advance some time before they provide reasonable scores. As already mentioned, it is also possible to apply certain number of received frames from the beginning of speech processing as a starting criterion.

According to another embodiment, the speech recognizer SR is configured to determine detection of end of utterance after a maximum number of frames producing substantially the same recognition result has been received. This embodiment may be used in combination with any of the features described above. By setting the maximum number reasonably high, this embodiment enables that it is possible to end speech processing after long enough "silence" period even though some criterion for detecting end of utterance has no been fulfilled e.g. due to some unexpected situation to which prevents detection of EOU.

It is important to notice that the problems related to stability check based end of utterance detection can be best avoided by combining at least most of the above illustrated features. Thus the above illustrated features may be combined in various ways within the invention, thereby causing multiple conditions which must be met before determining that end of utterance is detected. The features are suitable both for speaker dependent and speaker independent speech recognition. The threshold values can be optimized for different usage situations and testing the functioning of the end of utterance in these various situations.

Experiments on these methods have shown that that the amount of erroneous EOF detections can be largely avoided by combining the methods, especially in noisy environments. Further, the delays of detecting the end of utterance after actual end-point were smaller than in EOU detection without the present method.

It will be obvious to a person skilled in the art that, as the technology advances, the inventive concept can be implemented in various ways. The invention and its embodiments are not limited to the examples described above but may vary within the scope of the claims.

The invention claimed is:

1. A system comprising a speech recognizer with end of utterance detection, wherein the speech recognizer is configured to calculate values of state scores and token scores associated with frames of received speech data, the speech recognizer is configured to determine best state scores and best token scores, a best state score being a score of a state having the best probability amongst a number of states in a state model for speech recognition purposes, and a best token score being the best probability of a token amongst a number of tokens used for speech recognition purposes, the speech recognizer is configured to, at each received frame of received speech data, determine whether recognition result determined from received speech data is stabilized, if the recognition result determined from received speech data is not stabilized at a current frame, the speech recognizer is configured to continue speech processing for a next received speech frame and to calculate values of state scores and token scores and to determine the best state score and best token score for the next received speech frame, if the recognition result determined from speech data is stabilized at the current frame, the speech recognizer is configured to, in place of continuing speech processing for the next received frame, process values of the determined best state scores and best token scores associated with frames of received speech data for end of utterance detection purposes, and on the basis of the processed values of the best state scores and best token scores, whether end of utterance is detected or not, if the end of utterance is not detected on the basis of the processed values of the best state scores and best token scores, the speech recognizer is configured to continue speech processing for a next received speech frame and to calculate values of state scores and token scores and to determine the best state score and best token score for the next received speech frame, and if the end of utterance is detected on the basis of the processed values of the best state scores and best token scores, the speech recognizer is configured to end the speech processing.

2. A system according to claim 1, wherein the speech recognizer is configured to calculate a best state score sum by summing the best state score values of a pre-determined number of frames, in response to the recognition result being stabilized, the speech recognizer is configured to compare the best state score sum to a predetermined threshold sum value, and the speech recognizer is configured to determine detection of end of utterance if the best state score sum does not exceed the threshold sum value.

3. A system according to claim 2, wherein the speech recognizer is configured to normalize the best score sum by the number of detected silence models, and the speech recognizer is configured to compare the normalized best state score sum to the pre-determined threshold sum value.

4. A system according to claim 2, wherein the speech recognizer is further configured to compare the number of best state score sums exceeding the threshold sum value to a predetermined minimum number value defining the required minimum number of best state score sums exceeding the threshold sum value, and the speech recognizer is configured to determine detection of end of utterance if the number of best state score sums exceeding the threshold sum value is the same or larger than the predetermined minimum number value.

5. A system according to claim 1, wherein the speech recognizer is configured to wait a pre-determined time period before determining detection of end of utterance.

6. A system according to claim 1, wherein the speech recognizer is configured to determine best token score values repetitively, the speech recognizer is configured to calculate the slope of the best token score values based on at least two best token score values, the speech recognizer is configured to compare the slope to a pre-determined threshold slope value, and the speech recognizer is configured to determine detection of end of utterance if the slope does not exceed the threshold slope value.

7. A system according to claim 6, wherein the slope is calculated for each frame.

8. A system according to claim 6, wherein the speech recognizer is further configured to compare the number of slopes exceeding the threshold slope value to a predetermined minimum number of slopes exceeding the threshold slope value, and the speech recognizer is configured to determine detection of end of utterance if the number of best state score sums exceeding the threshold slope value is the same or larger than the predetermined minimum number.

9. A system according to claim 6, wherein the speech recognizer is configured to begin slope calculations only after a pre-determined number of frames has been received.

10. A system according to claim 1, wherein the speech recognizer is configured to determine best token score of at least one inter-word token and best token score of an exit token, and the speech recognizer is configured to determine detection of end of utterance only if the best token score value of the exit token is higher than the best token score of the inter-word token.

11. A system according to claim 1, wherein the speech recognizer is configured to determine detection of end of utterance only if the recognition result is not rejected.

12. A system according to claim 1, wherein the speech recognizer is configured to determine detection of end of utterance after a maximum number of frames producing substantially the same recognition result has been received.

13. A method comprising:

processing, in a data processing device, values of best state scores and best token scores associated with frames of received speech data for end of utterance detection purposes, the processing comprising:

calculating values of state scores and token scores associated with frames of received speech data, determining best state scores and best token scores, a best state score being a score of a state having the best probability amongst a number of states in a state model for speech recognition purposes, and a best token score being the best probability of a token amongst a number of tokens used for speech recognition purposes, determining whether recognition result determined from received speech data is stabilized, and determining, in response to the recognition result being stabilized, on the basis of the processed values of the best state scores and best token scores, whether end of utterance is detected or not.

14. A method according to claim 13, wherein a best state score sum is calculated by summing the best state score values of a pre-determined number of frames, in response to the recognition result being stabilized, the best state score sum is compared to a predetermined threshold sum value, and the detection of end of utterance is determined if the best state score sum does not exceed the threshold sum value.

15. A method according to claim 13, wherein best token score values are determined repetitively, the slope of the best token score values is calculated based on at least two best token score values, the slope is compared to a pre-determined threshold slope value, and the detection of end of utterance is determined if the slope does not exceed the threshold slope value.

16. A method according to claim 13, wherein best token score of at least one inter-word token and best token score of an exit token are determined, and the detection of end of utterance is determined only if the best token score value of the exit token is higher than the best token score of the inter-word token.

17. A method according to claim 13, wherein the detection of end of utterance is determined only if the recognition result is not rejected.

18. An electronic device comprising a speech recognizer, wherein the speech recognizer is configured to determine whether recognition result determined from received speech data is stabilized, the speech recognizer is configured to process values of best state scores and best token scores associated with frames of received speech data for end of utterance detection purposes, the processing comprising:

calculating values of state scores and token scores associated with frames of received speech data, determining best state scores and best token scores, a best state score being a score of a state having the best probability amongst a number of states in a state model for speech recognition purposes, and a best token score being the best probability of a token amongst a number of tokens used for speech recognition purposes, and the speech recognizer is configured to determine, in response to the recognition result being stabilized, on the basis of the processed values of the best state scores and best token scores whether end of utterance is detected or not.

19. An electronic device according to claim 18, wherein the speech recognizer is configured to calculate a best state score sum by summing the best state score values of a pre-determined number of frames, in response to the recognition result being stabilized, the speech recognizer is configured to compare the best state score sum to a predetermined threshold sum value, and the speech recognizer is configured to determine detection of end of utterance if the best state score sum does not exceed the threshold sum value.

20. An electronic device according to claim 19, wherein the speech recognizer is configured to normalize the best score sum by the number of detected silence models, and the speech recognizer is configured to compare the normalized best state score sum to the pre-determined threshold sum value.

21. An electronic device according to claim 19, wherein the speech recognizer is further configured to compare the number of best state score sums exceeding the threshold sum value to a predetermined minimum number value defining the required minimum number of best state score sums exceeding the threshold sum value, and the speech recognizer is configured to determine detection of end of utterance if the number of best state score sums exceeding the threshold sum value is the same or larger than the predetermined minimum number value.

22. An electronic device according to claim 18, wherein the speech recognizer is configured to wait a pre-determined time period before determining detection of end of utterance.

23. An electronic device according to claim 18, wherein the speech recognizer is configured to determine best token score values repetitively, the speech recognizer is configured to calculate the slope of the best token score values based on at least two best token score values, the speech recognizer is configured to compare the slope to a pre-determined threshold slope value, and the speech recognizer is configured to determine detection of end of utterance if the slope does not exceed the threshold slope value.

24. An electronic device according to claim 23, wherein the slope is calculated for each frame.

25. An electronic device according to claim 23, wherein the speech recognizer is further configured to compare the number of slopes exceeding the threshold slope value to a predetermined minimum number of slopes exceeding the threshold slope value, and the speech recognizer is configured to determine detection of end of utterance if the number of best state score sums exceeding the threshold slope value is the same or larger than the predetermined minimum number.

26. An electronic device according to claim 23, wherein the speech recognizer is configured to begin slope calculations only after a pre-determined number of frames has been received.

27. An electronic device according to claim 18, wherein the speech recognizer is configured to determine best token score of at least one inter-word token and best token score of an exit token, and the speech recognizer is configured to determine detection of end of utterance only if the best token score value of the exit token is higher than the best token score of the inter-word token.

28. An electronic device according to claim 18, wherein the speech recognizer is configured to determine detection of end of utterance only if the recognition result is not rejected.

29. An electronic device according to claim 18, wherein the speech recognizer is configured to determine detection of end of utterance after a maximum number of frames producing substantially the same recognition result has been received.

30. An electronic device according to claim 18, wherein the electronic device is a mobile phone or a PDA device.

31. A non-transitory computer readable medium encoded with a computer program, loadable into the memory of a data processing device, the computer program comprising:

program code for processing values of best state scores and best token scores associated with frames of received speech data for end of utterance detection purposes, the processing comprising calculating values of state scores and token scores associated with frames of received speech data, determining best state scores and best token scores, a best state score being a score of a state having the best probability amongst a number of states in a state model for speech recognition purposes, and a best token score being the best probability of a token amongst a number of tokens used for speech recognition purposes, program code for determining whether recognition result determined from received speech data is stabilized, and program code for determining, in response to the recognition result being stabilized, on the basis of the processed values of the best state scores and best token scores, whether end of utterance is detected or not.

32. A non-transitory computer readable medium according to claim 31, wherein at least part of the medium comprises a circuit or a memory.

33. An apparatus comprising a processor and a memory, the apparatus being configured to:

receive frames of speech data;

determine whether recognition result determined from the received speech data is stabilized;

process values of best state scores and best token scores associated with frames of received speech data for end of utterance detection purposes, the process comprising calculating values of state scores and token scores associated with frames of received speech data, determining best state scores and best token scores, a best state score being a score of a state having the best probability amongst a number of states in a state model for speech recognition purposes, and a best token score being the best probability of a token amongst a number of tokens used for speech recognition purposes; and determine, in response to the recognition result being stabilized, on the basis of the processed values of the best state scores and best token scores, whether end of utterance is detected or not.

34. An apparatus according to claim 33, where at least part of the apparatus comprises a circuit.

35. An apparatus comprising:

means for receiving frames of speech data;

means for determining whether a recognition result determined from the received speech data is stabilized;

means for processing values of best state scores and best token scores associated with frames of received speech data for end of utterance detection purposes, the processing comprising means for calculating values of state scores and token scores associated with frames of received speech data, means for determining best state scores and best token scores, a best state score being a score of a state having the best probability amongst a number of states in a state model for speech recognition purposes, and a best token score being the best probability of a token amongst a number of tokens used for speech recognition purposes; and means for determining, in response to the recognition result being stabilized, on the basis of the processed values of the best state scores and best token scores, whether end of utterance is detected or not.

36. An apparatus according to claim 35, further comprising:

means for calculating a best state score sum by summing the best state score values of a pre-determined number of frames, means for comparing the best state score sum to a predetermined threshold sum value in response to the recognition result being stabilized, and means for determining detection of end of utterance if the best state score sum does not exceed the threshold sum value.

* * * * *